(12) United States Patent
Tsuboi

(10) Patent No.: US 7,847,960 B2
(45) Date of Patent: Dec. 7, 2010

(54) MANAGING READING CONDITIONS IN AN IMAGE READING APPARATUS

(75) Inventor: Tomo Tsuboi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1676 days.

(21) Appl. No.: 10/898,289

(22) Filed: Jul. 26, 2004

(65) Prior Publication Data

US 2005/0213166 A1     Sep. 29, 2005

(30) Foreign Application Priority Data

Mar. 29, 2004  (JP)  .............................. 2004-095758
Mar. 29, 2004  (JP)  .............................. 2004-095759

(51) Int. Cl.
G06F 3/12    (2006.01)

(52) U.S. Cl. ........................ 358/1.15; 358/1.16; 358/1.9

(58) Field of Classification Search .................. 358/1.6, 358/1.15, 402, 440, 474, 505, 442
See application file for complete search history.

(56) References Cited

U.S. PATENT DOCUMENTS

| | | | |
|---|---|---|---|
| 6,687,742 B1 * | 2/2004 | Iwazaki | 709/206 |
| 6,700,674 B1 * | 3/2004 | Otsuka et al. | 358/1.15 |
| 7,068,165 B2 * | 6/2006 | Takahashi et al. | 358/1.15 |
| 7,124,209 B2 * | 10/2006 | Kato | 358/400 |
| 7,161,697 B2 * | 1/2007 | Yajima | 358/1.15 |
| 7,277,929 B2 * | 10/2007 | Ohara | 709/219 |
| 2002/0135792 A1 * | 9/2002 | Sommer et al. | 358/1.13 |
| 2003/0016394 A1 * | 1/2003 | Shinomiya | 358/402 |
| 2003/0117664 A1 * | 6/2003 | McCarthy, Jr. | 358/402 |
| 2004/0048621 A1 * | 3/2004 | Takahashi et al. | 455/456.3 |
| 2004/0061906 A1 * | 4/2004 | Rikima | 358/474 |
| 2004/0073684 A1 * | 4/2004 | Jodra et al. | 709/228 |
| 2004/0196492 A1 * | 10/2004 | Johnson et al. | 358/1.15 |
| 2004/0212823 A1 * | 10/2004 | Chavers et al. | 358/1.15 |
| 2004/0218205 A1 * | 11/2004 | Irwin et al. | 358/1.15 |

(Continued)

FOREIGN PATENT DOCUMENTS

JP    10207670    8/1998

(Continued)

OTHER PUBLICATIONS

Leung et al., "Palmprint Verification for Controlling Access to Shared Computing Resources", IEEE Pervasive Computing, vol. 6, Issue 4, Oct.-Dec. 2007, pp. 40-47.*

*Primary Examiner*—Twyler L Haskins
*Assistant Examiner*—Javier J Ramos
(74) *Attorney, Agent, or Firm*—Buchanan Ingersoll & Rooney PC

(57) ABSTRACT

In order to enable setting of a reading condition from an external apparatus, an image reading apparatus includes a reading unit reading a document and outputting an image data in accordance with a given reading condition, a communication unit communicating with an external apparatus through a communication line, a user interface unit receiving an instruction input from a user, and a control unit controlling the reading unit, the communication unit and the user interface unit, and the control unit includes an associating portion associating, when a reading condition is received from the external apparatus through the communication unit, the received reading condition with a one-touch key provided at the user interface unit.

11 Claims, 13 Drawing Sheets

U.S. PATENT DOCUMENTS

| | | | |
|---|---|---|---|
| 2005/0046893 A1 * | 3/2005 | Hirosawa et al. | 358/1.15 |
| 2006/0192990 A1 * | 8/2006 | Tonegawa | 358/1.15 |
| 2006/0209333 A1 * | 9/2006 | Takida | 358/1.15 |

FOREIGN PATENT DOCUMENTS

| | | |
|---|---|---|
| JP | 10207670 A * | 8/1998 |
| JP | 2001-217987 | 8/2001 |
| JP | 2001-339546 | 12/2001 |
| JP | 2002-290638 | 10/2002 |
| JP | 2003-298828 | 10/2003 |
| JP | 2003-333266 | 11/2003 |

* cited by examiner

<<MFPScanMode>>
Resolution[600]
OriginalSize[A4]
ImageDensity[3]
Destination[user@abc.co.jp]

F I G. 9
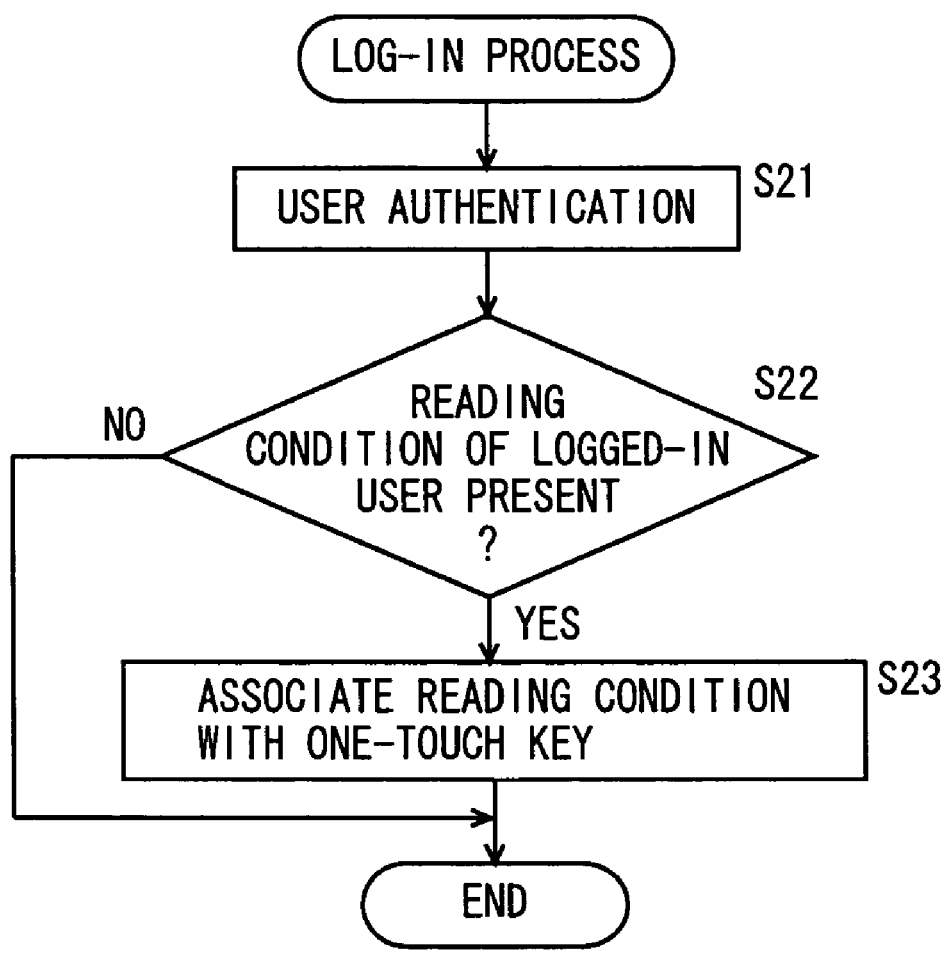

MANAGING READING CONDITIONS IN AN IMAGE READING APPARATUS

This application is based on Japanese Patent Applications Nos. 2004-095758 and 2004-095759 filed with the Japan Patent Office on Mar. 29, 2004, the entire content of which is hereby incorporated by reference.

BACKGROUND OF THE INVENTION

1. Field of the Invention

The present invention relates to an image reading apparatus, and a control program product and a control method for controlling the apparatus. Specifically, the present invention relates to an image reading apparatus reading a document and outputting image data, and a control program product and a control method for controlling the apparatus.

2. Description of the Related Art

A scanner that optically reads a document and outputs image data has been known. The scanner allows change in reading conditions such as resolution, reading density and reading size. Reading conditions differ user by user or document by document to be read. Therefore, the conditions must be set every time a document is to be read. Typically, a user operates operation buttons of the scanner to set reading conditions, before the scanner starts reading the document.

When the reading conditions are directly input by the user through the operation buttons of the scanner, it is the case that the scanner is occupied by the user. While the reading conditions are being set, reading operation cannot be carried out, and therefore, availability factor of the scanner decreases.

A technique for setting printing condition by remote operation has been described in Japanese Laid-Open Patent Publication No. 10-207670, though it is directed to a print system. Japanese Laid-Open Patent Publication No. 10-207670 describes a print system comprising an electronic mail terminal including an electronic mail transmitting unit transmitting an electronic mail through a network, and a print data receiving terminal including a print data receiving unit receiving print data through the network, wherein the electronic mail terminal includes an electronic mail forming unit forming an electronic mail describing commands that can be interpreted by the print data receiving terminal, and the print data receiving terminal includes an electronic mail receiving unit receiving the electronic mail formed by the electronic mail forming unit, a command interpreting unit interpreting the command in the electronic mail received by the electronic mail receiving unit, and a control unit controlling setting of conditions for printing, based on the command.

When the scanner is used, however, it is necessary to set a document on the scanner. Therefore, the user goes to the place where the scanner is placed. This means that when the reading condition of the scanner is set by remote operation, other documents cannot be read from when the reading condition is set until the document is set. When reading conditions are changed to read other documents, it follows that the reading condition that has been set through remote operation is lost.

The image data read by the scanner is electronic data, and therefore, it is impossible to visually determine image quality. Therefore, it is necessary to print the image by a printing apparatus or to display the image on a monitor, in order to determine whether the image data is of desired image quality. If the scanner is combined with a printing apparatus, it is possible to evaluate the image quality at the site by printing the image. The user, however, may forget the reading condition set previously.

Further, when it is desired to change the reading condition after viewing the image data obtained by reading the document, it is necessary to have the document read again under the changed reading condition.

SUMMARY OF THE INVENTION

The present invention was made to solve the above described problems, and its object is to provide an image reading apparatus allowing setting of a reading condition from an external apparatus, and to provide a control program product and a control method executed by the apparatus.

Another object of the present invention is to provide an image reading apparatus allowing easy setting of a reading condition, and to provide a control program product and a control method executed by the apparatus.

In order to attain the above described objects, the present invention provides, according to an aspect, an image reading apparatus, including: a reading unit reading a document and outputting an image data in accordance with a given reading condition, a communication unit communicating with an external apparatus through a communication line, a user interface unit receiving an instruction input from a user, and a control unit controlling the reading unit, the communication unit and the user interface unit, wherein the control unit includes an associating portion associating, when a reading condition is received from the external apparatus through the communication unit, the received reading condition with a one-touch key provided at the user interface unit.

According to the present invention, when a reading condition is received from an external apparatus, a one-touch key is associated with the received reading condition. Therefore, an image reading apparatus allowing setting of reading condition by an external apparatus can be provided.

According to another aspect, the present invention provides an image reading apparatus, including: a reading unit reading a document and outputting an image data in accordance with a given reading condition, an electronic mail transmitting and receiving unit transmitting and receiving an electronic mail, and a control unit controlling the reading unit and the electronic mail transmitting and receiving unit, wherein the control unit includes a setting portion setting a reading condition and a destination address, a reading instructing portion applying the reading condition set by the setting portion to the reading unit to have the reading unit output an image data, and an electronic mail generating portion generating and outputting to the electronic mail transmitting and receiving unit an electronic mail having the reading condition applied to the reading unit as a main message, the image data output from the reading unit as an attachment file and the destination address set by the setting portion as a destination.

According to the present invention, when a document is read under the set reading condition, an electronic mail having the reading condition as a main message, an image data as an attachment file, and a set destination address as a destination is prepared and transmitted. As the image data and the reading condition are transmitted by the electronic mail, it is possible for the user to evaluate the reading condition by visually checking the image data. As a result, an image reading apparatus allowing easy setting of reading conditions can be provided.

According to a still another aspect, the present invention provides an image reading apparatus, including: a reading unit reading a document and outputting an image data in accordance with a given reading condition, a storing unit storing the image data, an electronic mail transmitting and receiving unit transmitting and receiving an electronic mail, and a control unit controlling the reading unit, the storing unit and the electronic mail transmitting and receiving unit, wherein the control unit includes a setting portion setting a reading condition and a destination address, a reading instructing portion applying a reading condition corresponding to maximum performance of the reading unit to the reading unit to have the reading unit output a reference image data, and having the storing unit store the reference image data, a converting portion converting the reference image data output by the reading unit in accordance with the reading condition set by the setting portion to output a first image data, and an electronic mail generating portion generating and transmitting to the electronic mail transmitting and receiving unit an electronic mail having the reading condition set by the setting portion as a main message, the first image data as an attachment file and the destination address set by the setting portion as a destination.

According to the present invention, when the reading condition and the destination address are transmitted, the document is read under the reading condition allowing maximum performance of the reading unit, and a reference image data is stored. Then, a first image data obtained by image-converting the reference image data in accordance with the set reading condition is output. Further, an electronic mail is transmitted that has the reading condition as a main message, the first image data as an attachment file and the set destination address as a destination. As the image data and the reading condition are transmitted in the form of an electronic mail to the external apparatus, it is possible for the user of the external apparatus to evaluate the reading condition by visually checking the read image data. As a result, an image reading apparatus allowing easy setting of reading conditions can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flow chart representing a flow of a process executed when a user logs in to the MFP.

DESCRIPTION OF THE PREFERRED EMBODIMENTS

Figure 1:
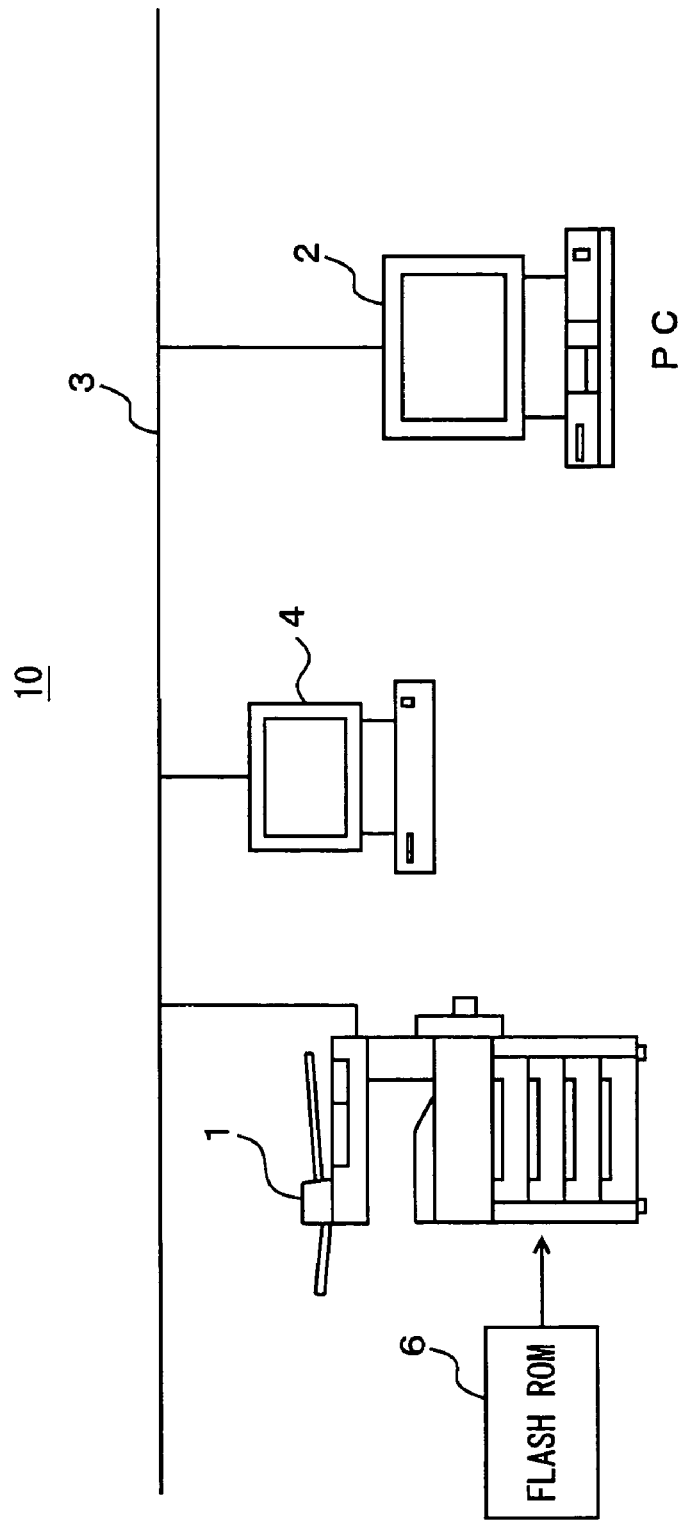
FIG. 1 is an illustration representing an overall image reading system in accordance with a first embodiment of the present invention.

Embodiments of the present invention will be described in the following with reference to the drawings. In the following description, same components are denoted by the same reference characters, and their names and functions are also the same. Therefore, detailed description thereof will not be repeated.

First Embodiment

FIG. 1 is an illustration representing an overall image reading system in accordance with a first embodiment of the present invention. Referring to FIG. 1, an image reading system 10 includes a multifunction peripheral 1 (hereinafter referred to as "MFP 1"), a mail server 2, and a user computer 4, each connected to a network 3. User computer 4 is a common personal computer. Though an example having one MFP 1, one mail server 2 and one personal computer 4 is shown in the figure, two or more such components may be provided.

MFP 1 includes a scanner for reading a document, an image forming apparatus for forming an image on a recording medium such as paper based on the image data, and a facsimile, and has functions of image reading, copying, transmitting and receiving facsimile, and printing data. Further, a detachable flash ROM 6 is mounted to MFP 1. A control program stored in flash ROM 6 is executed by a central processing unit (CPU) of MFP 1. The control program may be stored in an EEPROM (electrically erasable/programmable read only memory), rather than reading from flash ROM 6. MFP 1 has the program stored in the EEPROM executed by the CPU. As the EEPROM allows rewriting of the stored contents or additional writing, another computer connected to network 3 may rewrite an image processing program stored in the EEPROM of MFP 1, or may additionally write a new image processing program. Further, MFP 1 may download a control program from another computer connected to network 3 and the control program may be stored in the EEPROM.

Mail server 2 is a common personal computer. As the hardware configuration thereof is well known, description thereof will not be given here. Mail server 2 receives and stores an electronic mail from user computer 4 or MFP 1. Alternatively, upon request from user computer 4 or MFP 1 for downloading an electronic mail, the mail server transmits the corresponding electronic mail to user computer 4 or to MFP 1. A known mail server may be used for this purpose.

Network 3 may be a local area network (LAN), the Internet or a general public line, and it may be wired or wireless. Though an example in which MFP 1 and mail server 2 are connected through network 3 is shown here, MFP 1, mail server 2 and user computer 4 may be connected through a serial circuit or a parallel circuit.

Though the control program executed by MFP 1 is distributed stored in flash ROM 6 in this example, other recording medium carrying the program fixedly, such as a flexible disk, cassette tape, CD-ROM, hard disk, optical disk (MO (Magnetic Optical Disc)/MD (Mini Disc)/DVD (Digital Versatile Disc)), IC card (including memory card), optical card, mask ROM, EPROM, EEPROM and flash ROM may be used.

The program here includes, in addition to the program that can directly be executed by the CPU, a program in the form of a source program, a compressed program, and an encrypted program.

In image reading system 10 in accordance with the present embodiment, a reading condition for reading a document by MFP 1 is set by remote operation, from user computer 4. For this setting, an electronic mail is used. User computer 4 transmits an electronic mail including a reading condition and having MFP 1 as a destination. The electronic mail is passed through the mail server and received by MFP 1. MFP 1 extracts the reading condition from the received electronic mail. In this stage, MFP 1 does not set the reading condition, and allocates the reading condition to the MFP 1. The user having the document later moves to the place where MFP 1 is placed, sets the document on MFP 1 and presses the one-touch key, and the reading condition allocated to the one-touch key in advance is read.

Though MFP 1 is described as an example in the present embodiment, an apparatus at least including a scanner that reads a document and outputs image data may be used.

Figure 2:
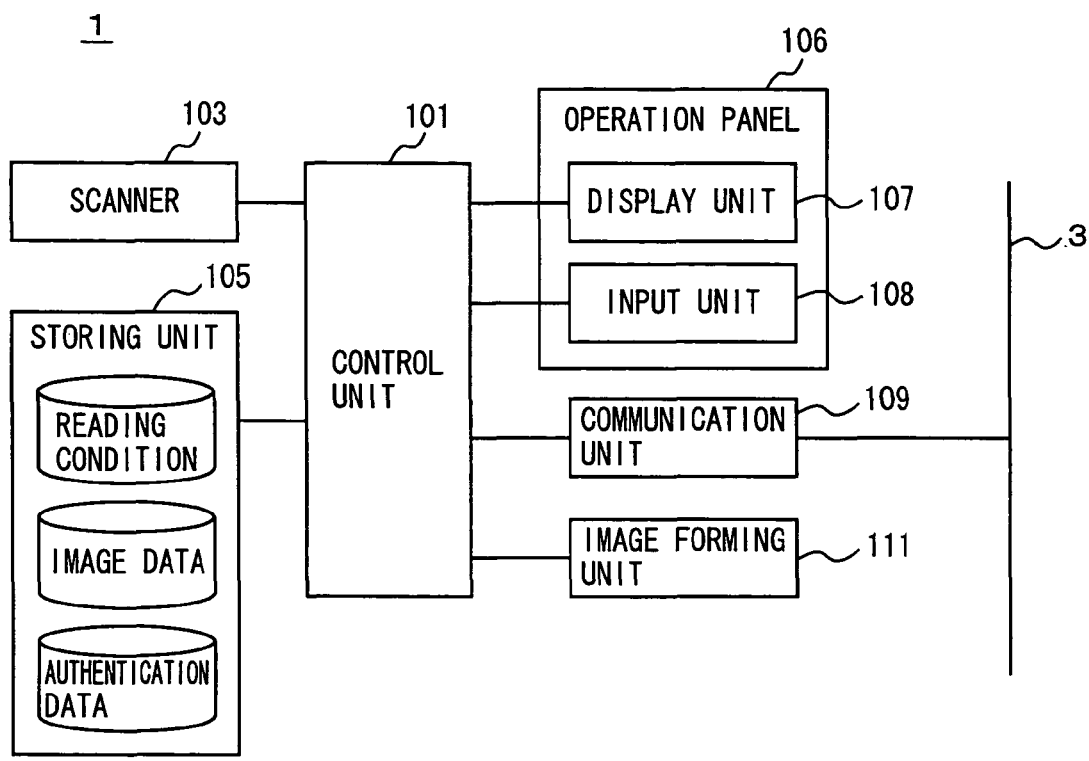
FIG. 2 is a functional block diagram representing a schematic configuration of an MFP in accordance with the first embodiment.

FIG. 2 is a functional block diagram representing a schematic configuration of MFP 1 in accordance with the present embodiment. MFP 1 includes a control unit 101 for overall control of MFP 1, a scanner 103 optically reading a document and outputting image data, a storing unit 105 for storing the reading condition, image data and the like, an operation panel 106 to be operated by the user, a communication unit 109 for connecting control unit 101 to network 3, and an image forming unit 111 for forming an image on a recording medium such as paper.

Scanner 103 includes a photoelectric conversion element such as a CCD (Charge Coupled Device), optically reads a document, and outputs image data as electronic data. The image data output from scanner 103 is output to storing unit 105.

Operation panel 106 includes an input unit 108 operated by the user for input, and a display unit 107 for displaying prescribed information.

Storing unit 105 is a storage device such as a hard disk. A semiconductor memory such as a random access memory (RAM) may be used as storing unit 105. Storing unit 105 stores the image data read by scanner 103, the reading condition set in MFP 1, and data for user authentication. Authentication data represents information associating user identification information, a password and an electronic mail address of the user with each other.

Communication unit 109 is a communication interface for connecting MFP 1 to network 3. Communication unit 109 communicates with mail server 2 and transmits/receives electronic mails. A predetermined mail address is allocated to MFP 1. Communication unit 109 inquires, at a prescribed time interval, whether there is any electronic mail addressed to the mail address allocated to MFP 1, and if there is any, downloads the same from mail server 2. When the electronic mail is received, MFP 1 transmits an electronic mail (return mail) addressed to the source of the electronic mail.

Image forming unit 111 visualizes the image data read by scanner 103 or image data received from other computer through communication unit 109.

Figure 3:
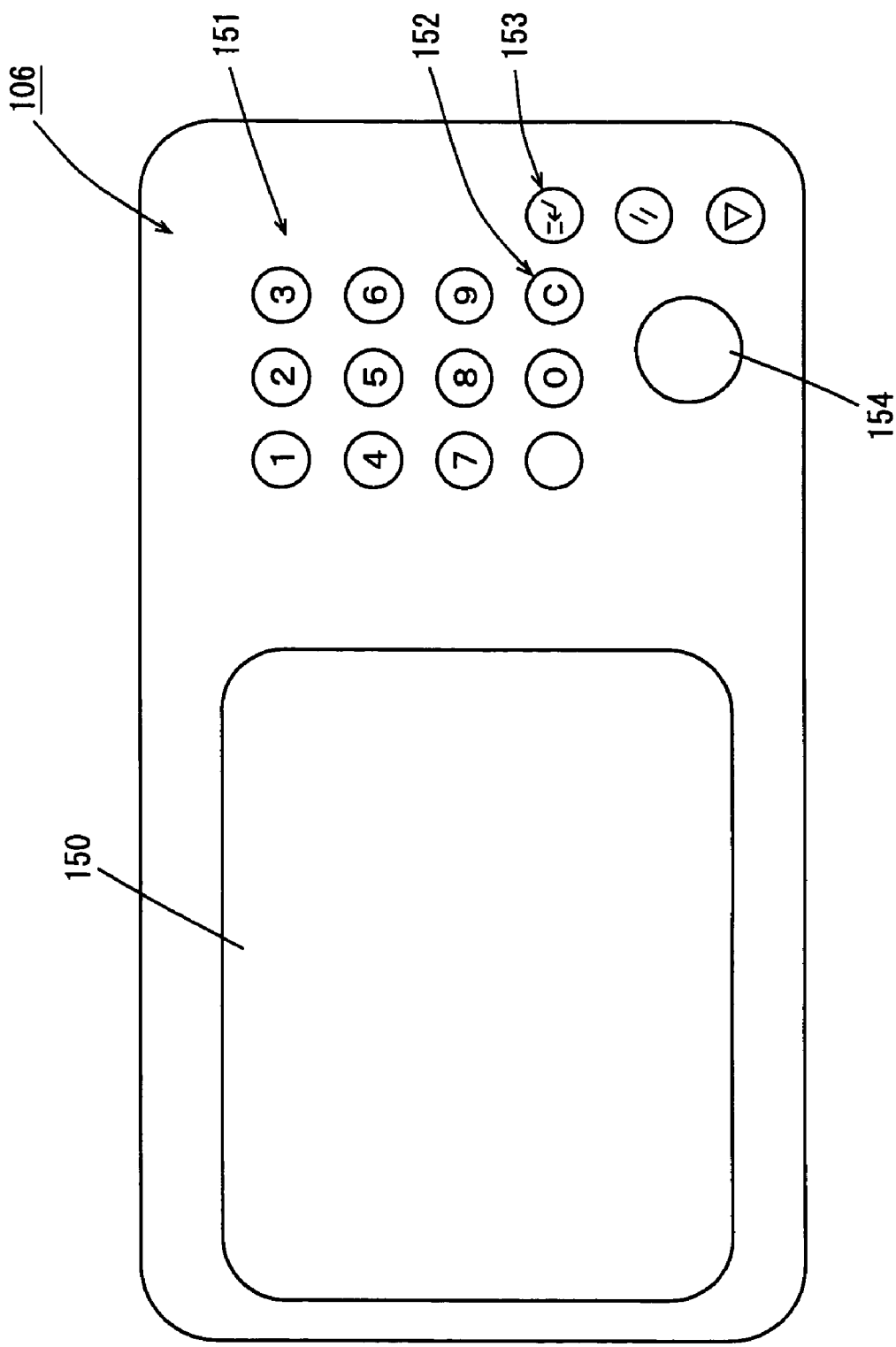
FIG. 3 is a plan view of an operation panel.

FIG. 3 is a plan view of the operation panel. Referring to FIG. 3, operation panel 106 includes a liquid crystal touch panel 150, ten keys 151, a clear key 152 for resetting a set numerical value to an initial value, an interruption key 153 for executing interruption copying, and a start key 154 for instructing start of image reading. Liquid crystal touch panel 150 is formed by stacking a touch panel of a transparent member on a liquid crystal display device. The liquid crystal display device corresponds to display unit 107. The touch panel, ten keys 151, clear key 152, interruption key 153 and start key 154 correspond to input unit 108. As instruction buttons are displayed on the liquid crystal display device and instruction through the buttons are detected by the touch panel, various operational inputs can be given. Operation panel 106 displays windows including a window showing the reading condition set in MFP 1, a window for setting the reading condition and so on.

Figure 4:
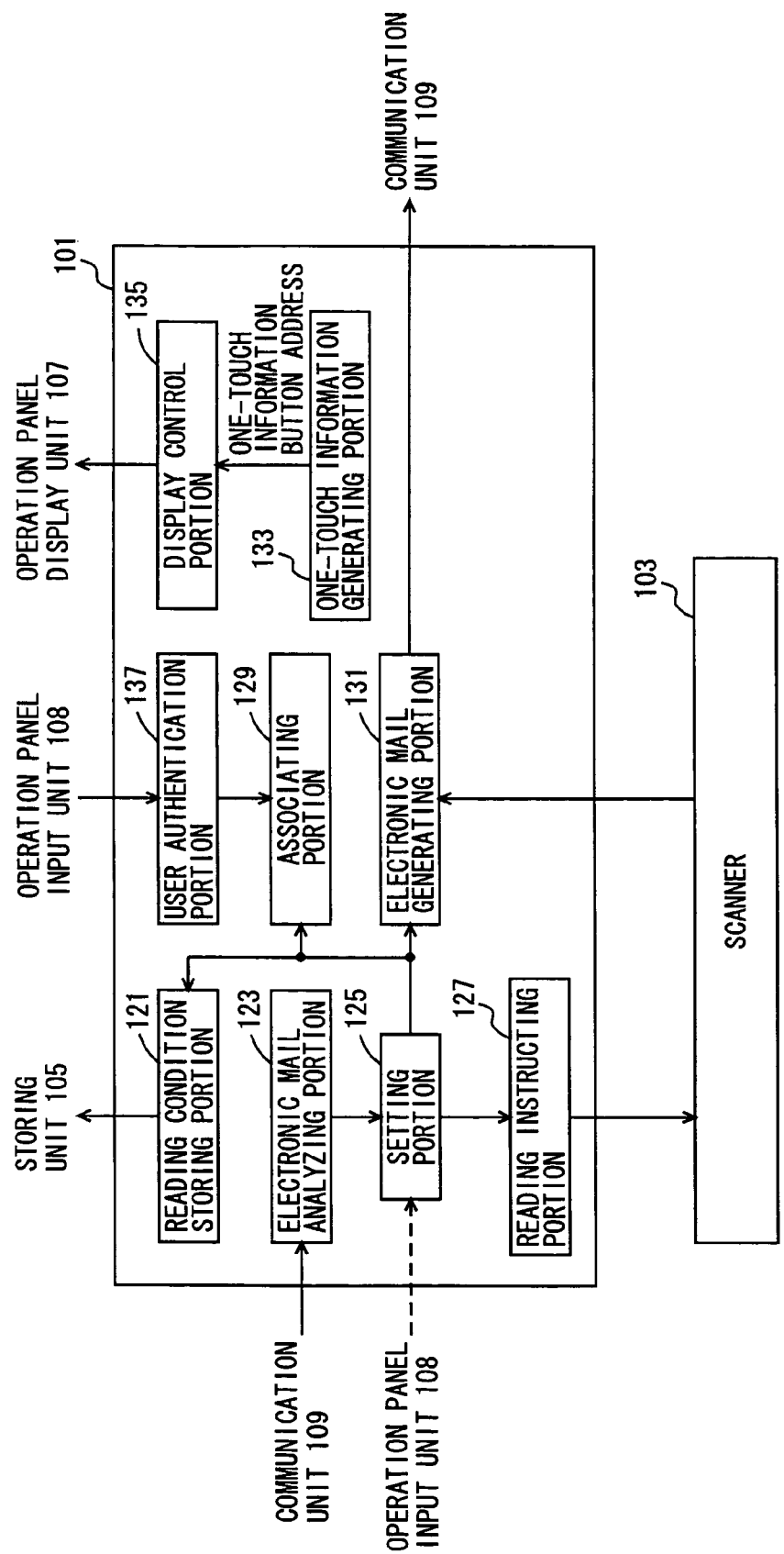
FIG. 4 is a functional block diagram representing detailed configuration of the control unit of the MFP in accordance with the first embodiment.

FIG. 4 is a functional block diagram representing detailed configuration of the control unit of the MFP in accordance with the present embodiment. Referring to FIG. 4, control unit 101 includes an electronic mail analyzing portion 123 analyzing the electronic mail received by communication unit 109, a reading condition storing portion 121 for storing the reading condition in storing unit 105, a setting portion 125 for setting the reading condition and the destination address of the electronic mail, a reading instructing portion 127 outputting the set reading condition to scanner 103, a user authentication portion 137 for user authentication, an associating portion 129 for associating the reading condition with the one-touch key, an electronic mail generating portion 131 for generating an electronic mail, a one-touch information generating portion 133 generating one-touch information to display the reading condition, and a display control portion 135 for controlling display unit 107.

Electronic mail analyzing portion 123 is connected to communication unit 109 and receives an electronic mail as an input. The electronic mail includes a header and a body. The header includes a destination address, a source address, a subject, and, if appropriate, a message ID and the like indicating that the mail is a return mail, described in a prescribed format. The body includes the main message of the electronic mail. In the present embodiment, an electronic mail for setting the reading condition is transmitted from user computer 4. As the main message of the body of the electronic mail, identification information representing that the electronic mail is for setting the reading condition, the reading condition to be set, and in some cases, a destination address, are described in a prescribed format. Electronic mail analyzing portion 123 analyzes the electronic mail, and upon detecting the identification information of the main message, extracts the destination address and the reading condition from the main message. Electronic mail analyzing portion 123 outputs the extracted destination address and the reading condition to setting portion 125.

Setting portion 125 is connected to input unit 108 of operation panel 106. To setting portion 125, the reading condition input through input unit 108 is input and, in addition, a destination address is input when the destination address has been input through input unit 108. Further, to setting portion 125, the reading condition is input from electronic mail analyzing portion 123 and, in addition, a destination address is input when the destination address has been described in the main message of the electronic mail. Specifically, setting portion 125 receives the reading condition and in some cases the destination address from either one of operation panel 106 and electronic mail analyzing portion 123. Setting portion 125 outputs the reading condition to electronic mail generating portion 131, associating portion 129, reading condition storing portion 121 and reading instructing portion 127. Further, when the destination address is input, setting portion 125 outputs the destination address to electronic mail generating portion 131.

Reading condition storing portion 121 receives as an input the reading condition from setting portion 125. The reading condition input from setting portion 125 is the reading condition input by the user through input unit 108 or the reading condition extracted from the electronic mail. Reading condition storing portion 121 is connected to storing unit 105, and has the input reading condition stored in storing unit 105. When the destination address is input in addition to the reading condition from setting portion 125, reading condition storing portion 121 has storing unit 105 store the input reading condition in association with the destination address.

User authentication portion 137 is connected to input unit 108 and storing unit 105. User authentication portion 137 compares the user identification information and the password input by the user through input unit 108 with the user identification information and the password stored in advance in storing unit 105. When they match as a result of comparison, the user is determined to be an authorized user, and if not, the user is determined to be an unauthorized user. The result of user authentication is output to associating portion 129.

To associating portion 129, the reading condition is input from setting portion 125, and the result of authentication is input from user authentication portion 137. Associating portion 129 associates the input reading condition with the one-touch key of input unit 108. The one-touch key has a predetermined button address, and associating portion 129 stores the button address in association with the reading condition that has been stored in storing unit 105. Association between the button address and the reading condition includes association of the address stored in storing unit 105 of the reading condition with the button address of the one-touch key. Associating portion 129 may associate the input reading condition with the one-touch key of input unit 108 on condition that the user is determined to be the authorized user as a result of authentication.

When pressing of the one-touch key at input unit 108 is detected, the button address of the one-touch key is input to one-touch information generating portion 133. Then, the reading condition stored in association with the button address is read from storing unit 105. One-touch information for displaying the read reading condition is generated. One-touch information generating portion 133 outputs the generated one-touch information to display control portion 135. Display control portion 135 controls display unit 107 and switches the information to be displayed on display unit 107. When the one-touch information is input from one-touch information generating portion 133, display control portion 135 controls display unit 107 such that the one-touch information is displayed on display unit 107.

Reading instructing portion 127 outputs the reading condition input from setting portion 125 to scanner 103. In response to the instruction from input unit 108, scanner 103 is activated. Then, scanner 103 reads the document and outputs image data in accordance with the reading condition. The instruction from input unit 108 corresponds to pressing of start key 154. When pressing of the one-touch key at input unit 108 is detected, the button address of the one-touch key is input to reading instructing portion 127. Then, the reading condition that has been stored in association with the button address is read from storing unit 105, and output to scanner 103. Further, the scanner is activated in response to the instruction from input unit 108.

Electronic mail generating portion 131 is connected to scanner 103. To electronic mail generating portion 131, the reading condition and the destination address are input from setting portion 125. When the image data is input from the scanner, electronic mail generating portion 131 generates an electronic mail that has the destination address input from setting portion 125 described at the header, the reading condition converted to a prescribed format and described as the main message, and the image data as the attachment file, and outputs the thus generated electronic mail to communication unit 109.

Communication unit 109 transmits the electronic mail input from electronic mail generating portion 131 to mail server 2.

Figures 5, 6:
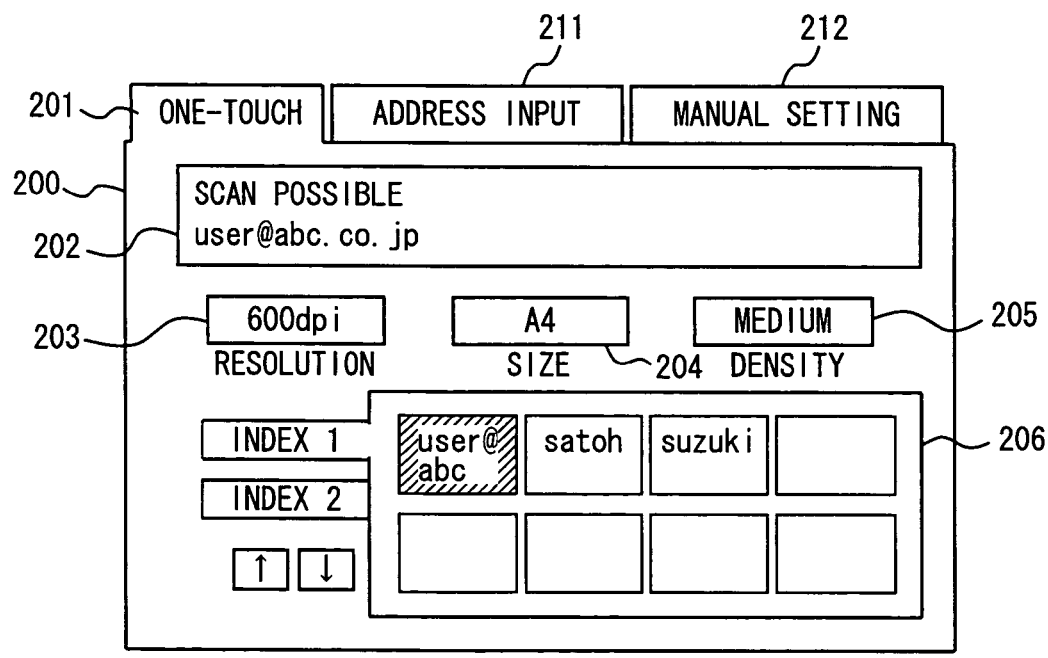
FIG. 5 shows an exemplary format of a main message at the body portion of the electronic mail.
FIG. 6 represents an example of a one-touch information display window.

FIG. 5 shows an exemplary format of the main message in the body of the electronic mail. The electronic mail received by MFP 1 and the main message in the body of the electronic mail transmitted by MFP 1 are described in this format. Therefore, electronic mail analyzing portion 123 extracts the destination address and the reading condition from the main message in accordance with this format, and electronic mail generating portion 131 generates the main message describing the reading condition in accordance with this format.

Referring to FIG. 5, the format of the reading condition includes an area for describing identification information representing that the electronic mail is for setting the reading condition, an area for describing the reading condition to be set, and an area for describing the destination address. Here, the identification information indicating that the electronic mail is for setting the reading condition is given as a character string <<MFPScanNode>>. The identification information is provided to enable MFP 1 to detect that the electronic mail is used for setting the reading condition, in consideration of a possibility that there are different types of processes to be executed by MFP 1 upon reception of electronic mails. The identification information may be described as the subject at the header, not in the body of the electronic mail.

Following the identification information, the reading condition is described. The reading condition is described by a combination of a predetermined character string and a set value thereof, for specifying one of a plurality of reading conditions. As for the reading condition related to resolution, a character string "Resolution" and a value [600] are described. As for the document size, a character string "Original Size" and a value [A4] are described. As for the reading condition of density, a character string "ImageDensity" and a value [3] are described.

Following the reading condition, the destination address is described. As the destination address, a predetermined character string "Destination" indicating that the destination address is described, and a value [user@abc.co.jp] are described. The description of the destination address is optional.

FIG. 6 represents an example of one-touch information. Referring to FIG. 6, one-touch information 200 is represented as a display window including a one-touch key 201, a status display area 202, reading condition display areas 203, 204, 205, and a destination display area 206. The example shown in FIG. 6 further includes, above the one-touch information 200, a transition button 211 having a character string "address input" and a transition button 212 having a character string "manual setting." Transition button 211 is for switching to the address input window allowing input of the destination address of the electronic mail. Transition button 212 is for switching to a manual setting window allowing manual setting of the reading condition. When the address input window or manual setting window is displayed on display unit 107, one-touch key 201 as a part of one-touch information 100 is displayed on display unit 107. In the state where the address input window or manual setting window is displayed, one-touch key 201 serves as a transition button to have one-touch information 200 displayed on display unit 107.

Reading condition display area 203 is for displaying the reading condition related to the resolution when scanner 103 reads a document. Reading condition display area 204 is for displaying the document size when scanner 103 reads the document. Reading condition display area 205 is for displaying the reading condition related to density when scanner 103 reads the document.

Destination display area 206 is for displaying the electronic mail address of the destination of the electronic mail. Destination display area 206 allows display of a plurality of electronic mail addresses, and the electronic mail address set as the destination address is displayed in a manner different from other addresses. In FIG. 6, the set electronic mail address is shown high-lighted. MFP 1 stores in advance electronic mail addresses in storing unit 105. Destination display area 206 displays the electronic mail addresses stored in storing unit 105. When one-touch information generating portion 133 reads the reading condition from storing unit 105 and the reading condition is associated with the destination address, the destination address is displayed in a manner different from others.

Figure 7:
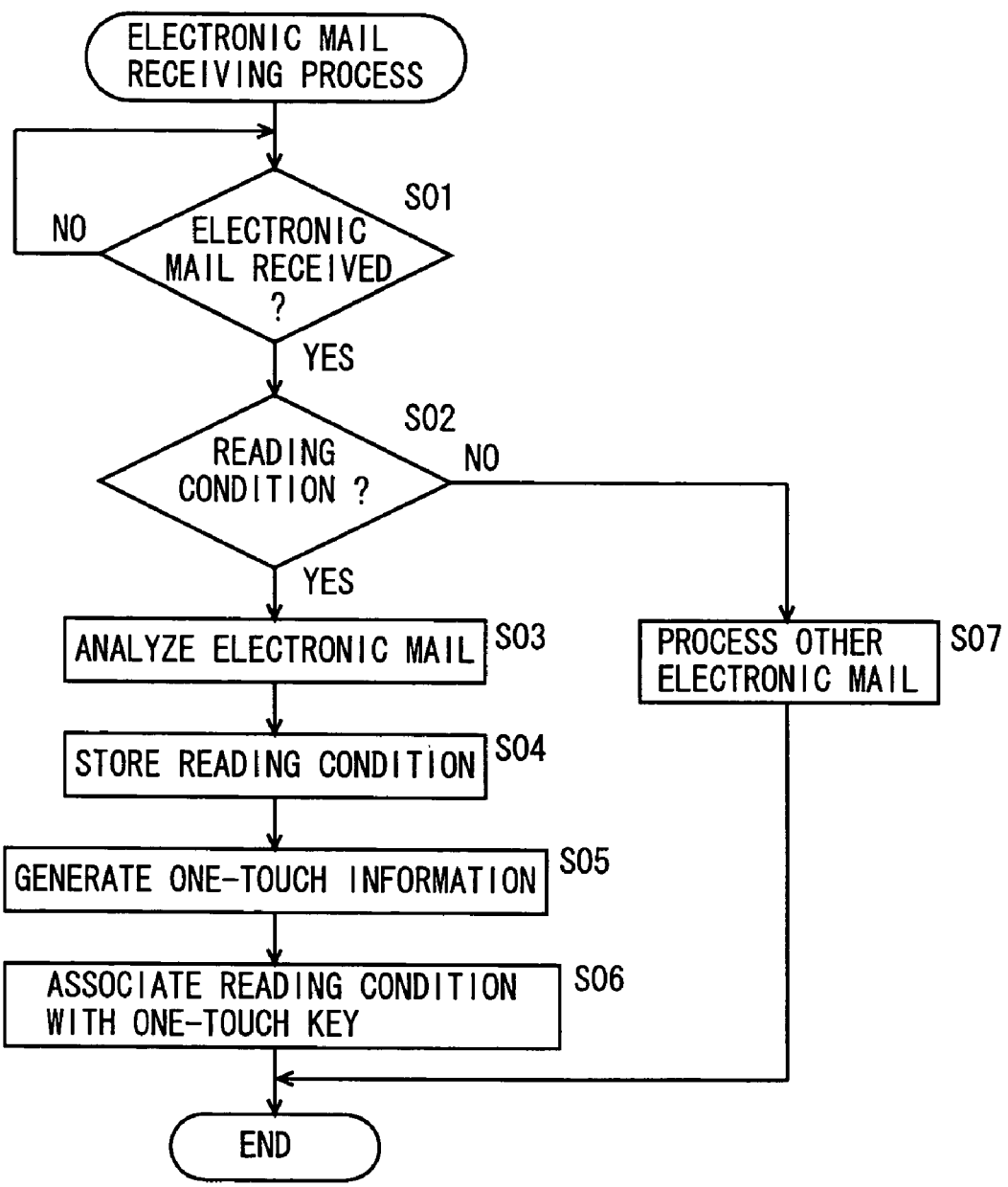
FIG. 7 is a flow chart representing a flow of an electronic mail receiving process executed by the MFP in accordance with the first embodiment.

FIG. 7 is a flow chart representing the flow of the electronic mail receiving process executed by the MFP in accordance with the present embodiment. Referring to FIG. 7, first, whether an electronic mail has been received or not is determined (step S01). When an electronic mail has been received, the flow proceeds to step S02, and if not, the flow is kept in a standby state. Namely, the electronic mail receiving process is executed when an electronic mail is received. The electronic mail received in step S01 is not limited to an electronic mail for setting the reading condition, and it may be a return mail or a mail for any other purpose.

In step S02, whether the received electronic mail is for setting the reading condition or not is determined. Specifically, whether the main message at the body of the received electronic mail includes identification information <<MEP-ScanMode>> indicating that the electronic mail is for setting the reading condition or not is determined. If it is the case, the flow proceeds to step S03, and otherwise the flow proceeds to step S07. In step S07, other processing of the electronic mail is executed.

In step S03, the received electronic mail is analyzed. The main message at the body of the received electronic mail is analyzed in accordance with the format described above, and the reading condition is extracted. Further, when a destination address is described, the destination address is also extracted.

The extracted reading condition is stored in storing unit 105 (step S04). When the destination address has also been extracted, the reading condition is stored in association with the destination address. In the next step S05, one-touch information is generated. One-touch information is, by way of example, a window displaying the reading condition such as shown in FIG. 6. The generated one-touch information is stored in storing unit 105.

The extracted reading condition is associated with the one-touch key at input unit 108. Specifically, a button address predetermined for the one-touch key is stored in storing unit 105, in association with the reading condition that has been stored in storing unit 105 in step S04.

The electronic mail receiving process is executed every time an electronic mail is received by MFP 1. Therefore, every time an electronic mail for setting the reading condition is received, the reading condition is up-dated. It is noted that MFP 1 may be adapted to store the reading condition every time an electronic mail for setting the reading condition is received. In that case, one-touch information will be generated corresponding in number to the stored reading conditions. Therefore, it becomes necessary to provide one-touch keys corresponding to the number of stored reading conditions.

<Modification of Electronic Mail Receiving Process>

Figure 8:
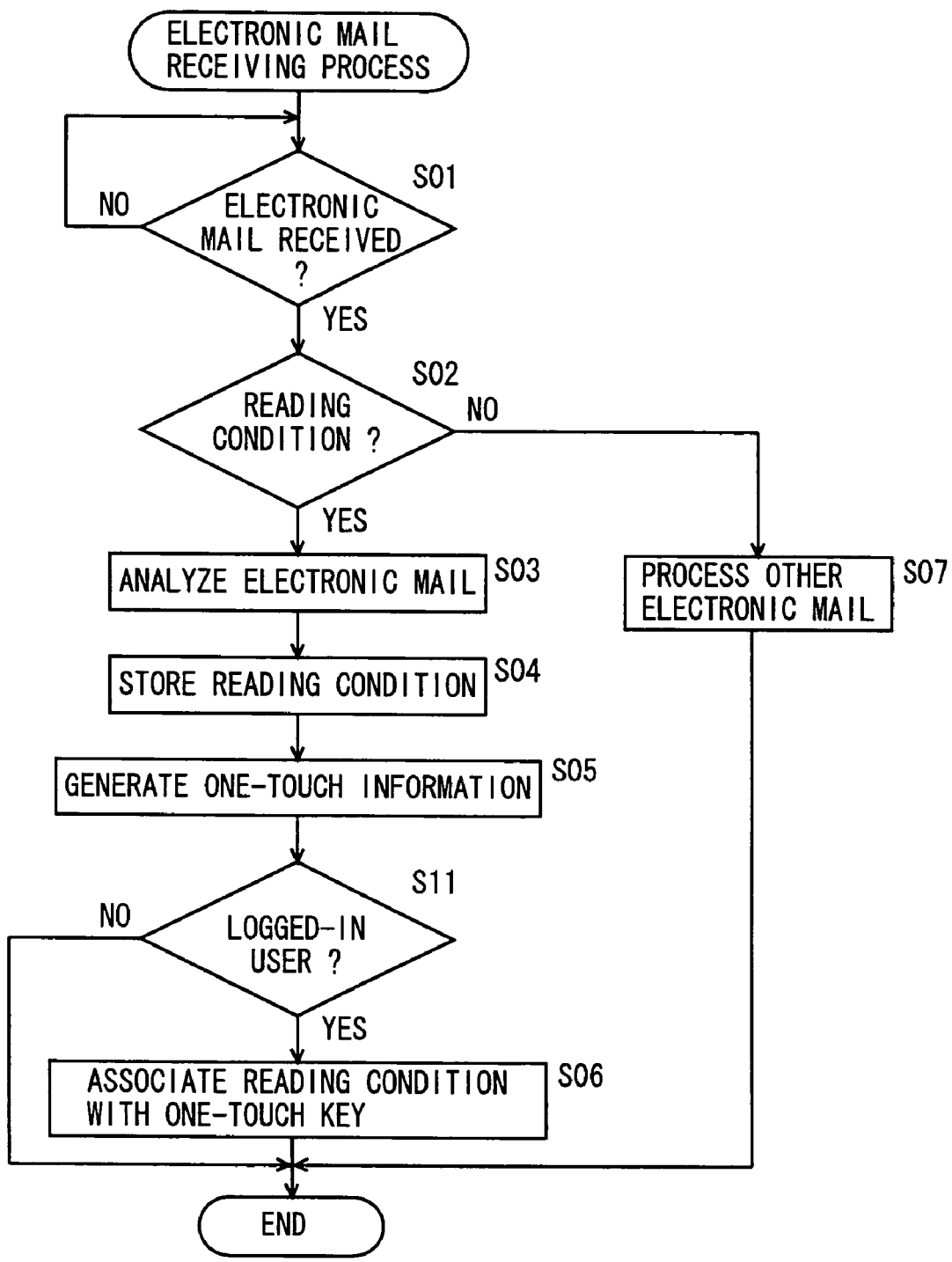
FIG. 8 is a flow chart representing an exemplary flow of a modified electronic mail receiving process.

In a modification of the electronic mail receiving process, the reading condition is made valid user by user. FIG. 8 is a first flow chart representing the flow in accordance with the modified electronic mail receiving process. Referring to FIG. 8, the modification of the electronic mail receiving process differs from the electronic mail receiving process shown in FIG. 7 in that step S11 is added between steps S05 and S06. In step S11, whether the source address of the electronic mail received in step S01 matches the electronic mail address of a user presently logged-in to MFP 1 or not is determined. If it is the case, the flow proceeds to step S06, and if not, step S06 is skipped and the process is terminated. Here, a user is logged-in to MFP 1 when the user identification information and the password input by the user through input unit 108 of MFP 1 are authenticated by user authentication portion 137 until the user inputs an instruction for log-out through input unit 108 of MFP 1. In the present embodiment, only one user can log-in to MFP 1 at one time. Therefore, if MFP 1 has only one one-touch key for associating the reading condition, only the reading condition set by the user who is logged-in to MFP 1 can be associated with the one-touch key.

When a user who is not logged-in transmits an electronic mail, the reading condition extracted from the electronic mail is stored in storing unit 105 in step S04. The condition, however, is not associated with the one-touch key. The process for associating the reading condition stored in storing unit 105 with the one-touch key is executed when the user logs-in to MFP 1 in this state.

FIG. 9 is a flow chart representing the flow of the process executed when a user logs-in to MFP 1. Referring to FIG. 9, in step S21, user authentication takes place. If the user is determined to be an authorized user, the user can log-in to MFP 1. Whether the reading condition of the logged-in user has been stored in storing unit 105 or not is determined (step S22). When it is stored, the flow proceeds to step S23, and otherwise, step S23 is skipped and the process is terminated. In step S04 of FIG. 8, the reading condition extracted from the electronic mail is stored in association with the destination address. In step S23, the electronic mail address of the logged-in user is read from the authentication data stored in storing unit 105, and the reading condition stored in storing unit 105 is extracted in association with the electronic mail address. In step S22, determination is made as to whether such reading condition has been extracted and the flow should proceed to step S23 or not, and if such condition is not extracted, the process is terminated.

In step S23, the reading condition read in step S22 is associated with the one-touch key. The process is similar to that of step S06 shown in FIG. 8.

In the log-in process, even when the user is not logged-in to MFP 1, the reading condition can be associated with the one-touch key by transmitting an electronic mail for setting the reading condition from user computer 4 to MFP 1, bringing the document to the place where MFP 1 is positioned, and by logging-in to MFP 1. Therefore, it is possible for the user to read the document under the predetermined condition simply by giving an instruction through the one-touch key.

Figure 10:
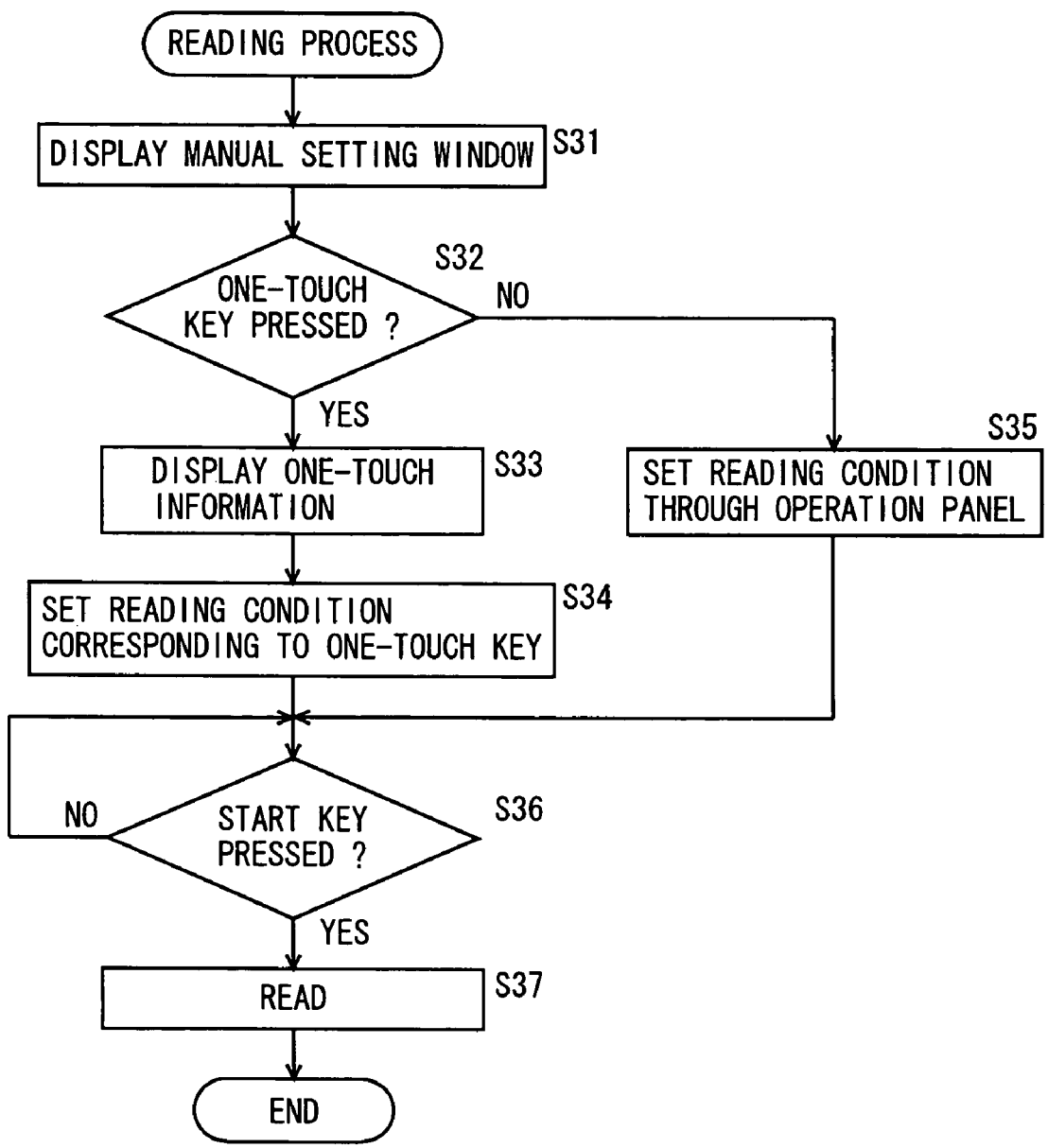
FIG. 10 is a flow chart representing a flow of a reading process executed by the MFP in accordance with the first embodiment.

FIG. 10 is a flow chart representing the flow of the reading process executed by the MFP in accordance with the present embodiment. Referring to FIG. 10, MFP 1 has a manual setting window displayed on display unit 107 of operation panel 106 (step S31). Immediately after power-on, MFP 1 has the manual setting window displayed on display unit 107. The manual setting window allows the user to designate the reading condition. The reading condition includes reading resolution, document size, and reading density. Immediately after power-on of MFP 1 or when clear key 152 is pressed, the manual setting window displaying predetermined initial values as the reading condition appears on display unit 107. On display unit 107, the manual setting window and one-touch key 201 are displayed.

In the next step S32, whether one-touch key 201 is pressed or not is determined. When one-touch key 201 is pressed, the flow proceeds to step S33, and otherwise, the flow proceeds to step S35. In step S35, setting of the reading condition by the user is accepted. As described above, the manual setting window is displayed on display unit 107, and therefore, the user may set the reading condition by changing the displayed initial value or values using the manual setting window.

In step S33, MFP 1 displays the one-touch information. Here, a window displaying the reading condition associated with the one-touch key shown in FIG. 6 appears on display unit 107. Then, the reading condition corresponding to the one-touch key is set (step S34). In storing unit 105, the button address allocated to the one-touch key and the reading condition have been stored associated with each other. When it is detected that one-touch key 201 is pressed at input unit 108, MFP 1 reads the reading condition from the storing unit 105 in accordance with the button address, and sets the read reading condition. When the reading condition is adapted to be stored in a predetermined address of storing unit 105, MFP 1 reads and sets the reading condition stored in the address, when pressing of the one-touch key is detected.

Thereafter, whether start key 154 of operation panel 106 is pressed or not is detected (step S36). When it is pressed, the flow proceeds to step S37, and otherwise, the flow is kept in a standby state. Specifically, until the start key 154 is pressed, setting of the reading condition by the user in step S35 is allowed. Further, it may be possible for the user to change the reading condition after checking the one-touch information.

In step S37, the document is read in accordance with the reading condition set in step S34 or S35. Specifically, reading instructing portion 127 outputs the reading condition to scanner 103 and activates the scanner.

In the reading process, the document is read and an image data is obtained. The image data may be output to image forming unit 111 to be printed, stored in storing unit 105, or may be output to communication unit 109 to be transmitted to another apparatus. Here, a reading and transmitting process in which the image data is transmitted to another apparatus will be described.

Figure 11:
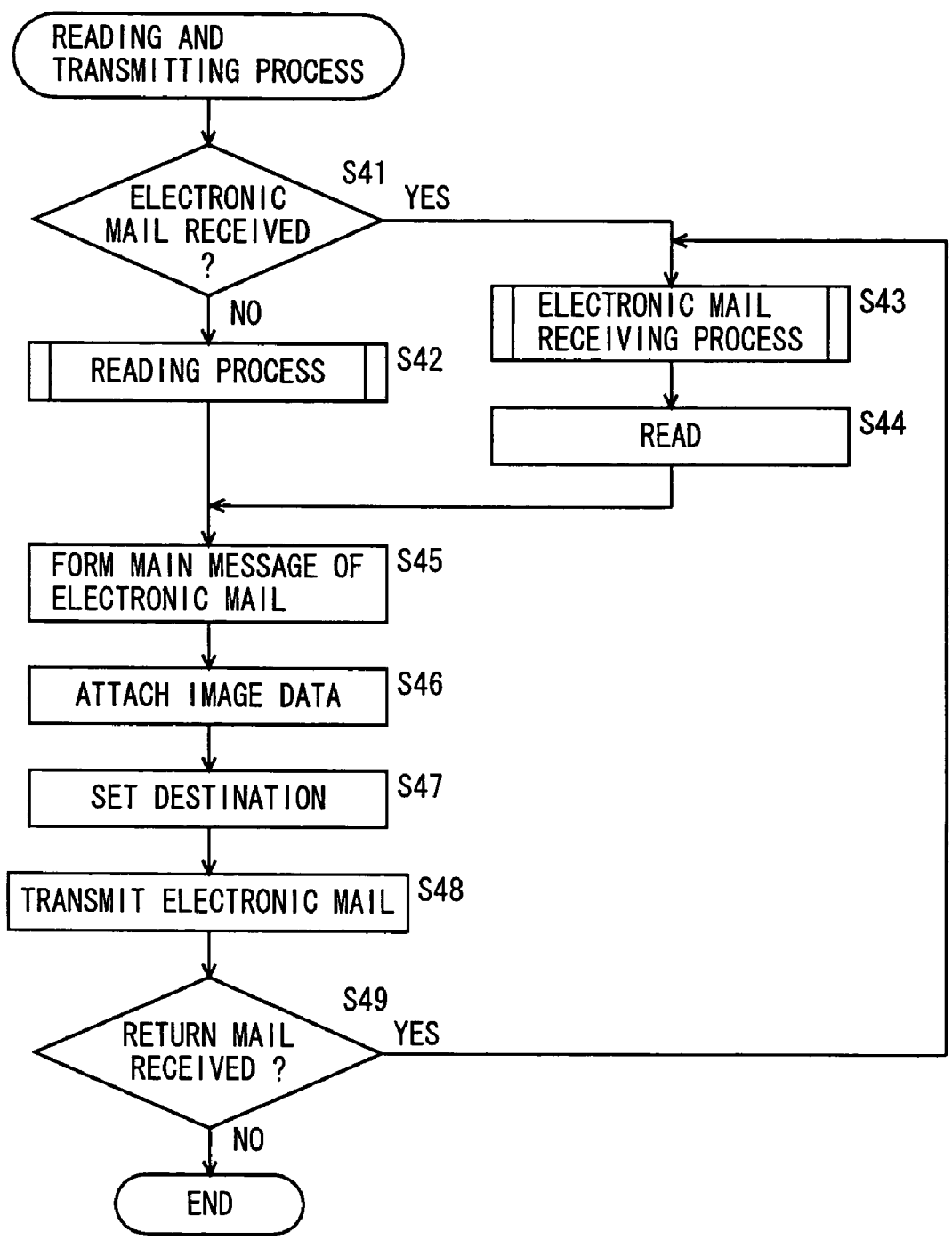
FIG. 11 is a flow chart representing a flow of a reading and transmitting process executed by the MFP in accordance with the first embodiment.

FIG. 11 is a flow chart representing the flow of the reading and transmitting process executed by the MFP in accordance with the present embodiment. Referring to FIG. 11, whether an electronic mail is received by communication unit 109 or not is determined (step S41). When an electronic mail has been received, the flow proceeds to step S43, and otherwise, the flow proceeds to step S42. In step S42, the reading process described with reference to FIG. 10 is executed, the document is read and the flow proceeds to step S45.

In step S43, the electronic mail receiving process described with reference to FIG. 7 is executed (step S43). Then, the document is read under the reading condition extracted from the received electronic mail (step S44). Then, the flow proceeds to step S45.

In step S45, the main message of the electronic mail is formed. The main message is formed by describing the reading condition in the format shown in FIG. 5. When an electronic mail has been received, the reading condition is the condition extracted from the main message of the electronic mail in the electronic mail receiving process executed in step S43. If any electronic mail has not been received, the reading condition is the condition set in the reading process executed in step S42, that is, the reading condition associated with the one-touch key if the user has pressed the one-touch key, and the reading condition input through the manual setting window if the one-touch key has not been pressed.

The image data obtained by reading the document is set as the attachment file of the electronic mail (step S46). Further, the destination address is set as the destination at the header of the electronic mail (step S47). When an electronic mail has been received, the destination address is the address extracted from the main message of the electronic mail in the electronic mail receiving process executed in step S43, and if any electronic mail has not been received, the destination address is the address set in the reading process executed in step S42, that is, the destination address associated with the one-touch key if the user has pressed the one-touch key, and the destination address input through the manual setting window if the one-touch key has not been pressed.

In the next step S48, the generated electronic mail is transmitted from communication unit 109 to mail server 2. When the set destination address is the electronic mail address allocated to the user in advance, it is possible for the user to download the electronic mail from mail server 2 to user computer 4. Therefore, it is possible for the user to have the reading condition and the image data on the display of user computer 4. Therefore, it is possible to evaluate the reading condition while viewing the read image data. When higher image quality is desired, or when smaller amount of data is desired by lowering image quality, the user may form an electronic mail (return mail) describing the corresponding reading condition and return the mail to MFP 1, so that image data read under the corresponding reading condition can be received.

In step S49, whether a return mail to the electronic mail transmitted in step S48 has been received or not is determined. If a return mail has been received, the flow proceeds to step S43, and if not, the process is terminated. Whether a mail is a return mail or not is determined from a message ID described at "in-Reply-to:" at the header of a received electronic mail.

As described above, in MFP 1 in accordance with the present embodiment, when the electronic mail transmitted from user computer 4 is received, the reading condition included in the electronic mail is associated with a one-touch key. Therefore, it is possible to set the reading condition from the user computer 4. Further, what is necessary is simply to install a program for transmitting the electronic mail, and it is unnecessary to install a special program for setting the reading condition in MFP 1.

Further, MFP 1 forms an electronic mail having the reading condition as the main message and the image data as the attachment file and transmits the same to the destination address. Therefore, it is possible for the user to evaluate the reading condition while viewing the image data.

Further, when a return mail to the transmitted electronic mail is received, the reading condition extracted from the return mail is associated with the one-touch key, and therefore, it is possible for the user who has checked the image data read under the previous reading condition to set the changed reading condition to one-touch key 201.

Further, when one-touch key 201 is pressed, MFP 1 displays a window (one-touch information) showing the reading condition associated with one-touch key 201, and therefore, it is possible for the user to confirm the reading condition on the window.

Further, when the one-touch key is pressed and start key 154 is pressed, MFP 1 outputs the reading condition to the scanner, and therefore it is possible for the user to have the document read under the desired condition.

Further, MFP 1 associates the reading condition with one-touch key 201 on condition that the user has logged-in, and therefore, it is possible to set the reading condition corresponding to each user to one-touch key 201.

Second Embodiment

The image reading system in accordance with the second embodiment has a system configuration similar to that of image reading system 10 shown in FIG. 1. MFP 1 in accordance with the second embodiment is formed to have a functional configuration similar to that of MFP 1 shown in FIG. 2.

Figure 12:
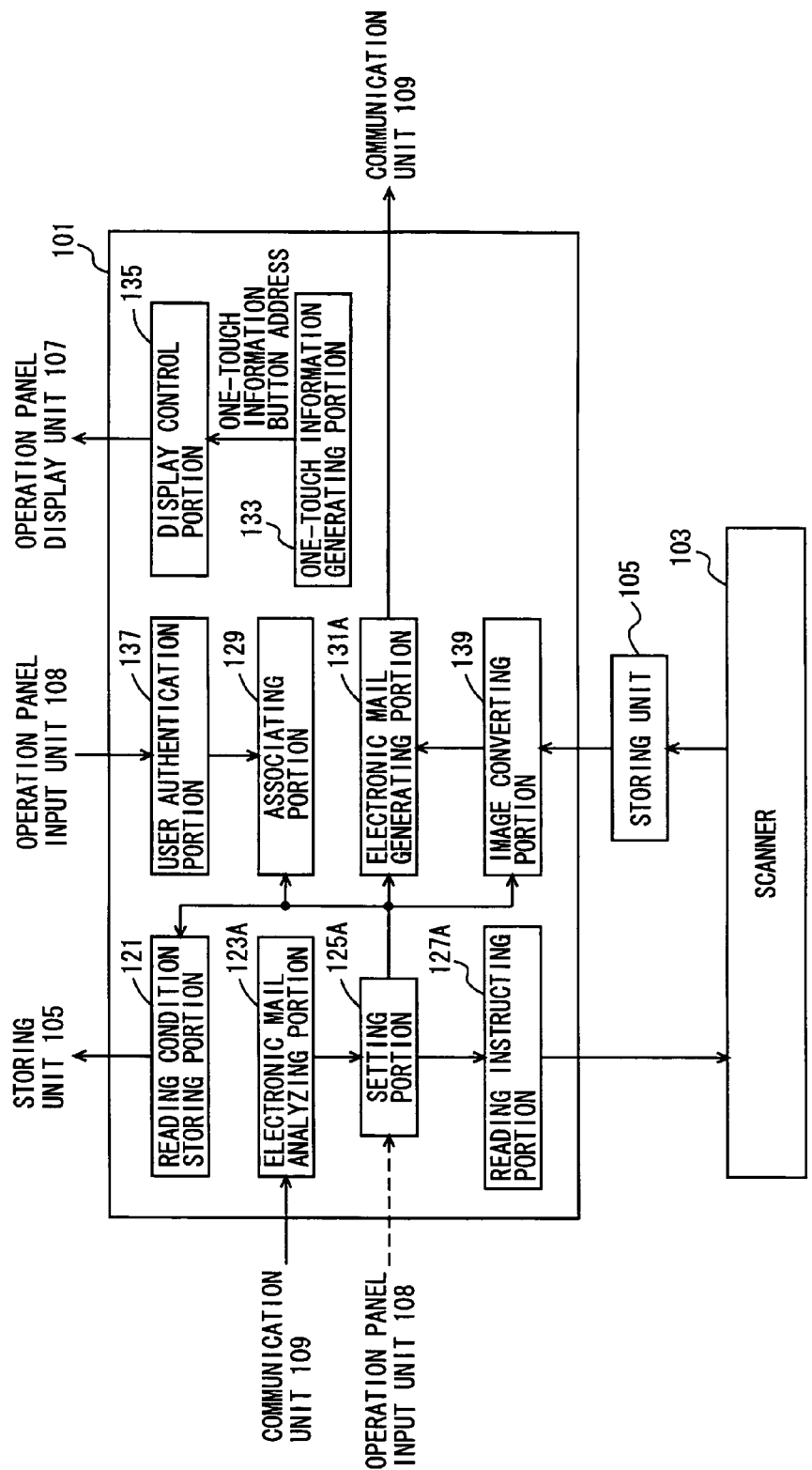
FIG. 12 is a functional block diagram representing a detailed configuration of a control unit of the MFP in accordance with a second embodiment.

FIG. 12 is a functional block diagram representing a detailed configuration of the control unit of the MFP in accordance with the second embodiment. Referring to FIG. 12, control unit 101 includes an electronic mail analyzing portion 123A analyzing an electronic mail received by communication unit 109, a reading condition storing portion 121 for storing the reading condition in storing unit 105, a setting portion 125A for setting the reading condition and the destination of the electronic mail, a reading instructing portion 127A outputting the reading condition to scanner 103, a user authentication portion 137 for user authentication, an associating portion 129 associating the reading condition with the one-touch key, an electronic mail generating portion 131A for generating an electronic mail, a one-touch information generating portion 133 generating the one-touch information for displaying the reading condition, a display control portion 135 for controlling display unit 107, and an image converting portion 139 for converting the image data stored in storing unit 105 in accordance with the changed reading condition.

Electronic mail analyzing portion 123A is connected to communication unit 109 and receives an electronic mail as an input. The electronic mail includes a header and a body. The header includes a destination address, a source address, a subject, and, if appropriate, a message ID and the like indicating that the mail is a return mail, described in a prescribed format. The body includes the main message of the electronic mail. In the present embodiment, an electronic mail for setting the reading condition is transmitted from user computer 4. As the main message of the body of the electronic mail, identification information representing that the electronic mail is for setting the reading condition, the reading condition to be set, and in some cases a destination address, are described in a prescribed format. Electronic mail analyzing portion 123A analyzes the electronic mail, and upon detecting the identification information of the main message, extracts the destination address and the reading condition from the main message. Electronic mail analyzing portion 123A outputs the extracted destination address and the reading condition to setting portion 125A.

Further, when a return mail to a once transmitted electronic mail is received, electronic mail analyzing portion 123A analyzes the return mail and extracts the destination and the reading condition, and outputs information indicating that the mail is a return mail, the destination and the reading condition to setting portion 125A.

Setting portion 125A is connected to input unit 108 of operation panel 106. To setting portion 125A, the reading condition input through input unit 108 is input and, in addition, a destination address is input when the destination address has been input through input unit 108. Further, to setting portion 125A, the reading condition is input from electronic mail analyzing portion 123A and, in addition, a destination address is input when the destination address has been described in the main message of the electronic mail. Specifically, setting portion 125A receives the reading condition and in some cases the destination address from either one of operation panel 106 and electronic mail analyzing portion 123A. Setting portion 125A outputs the reading condition to electronic mail generating portion 131A, associating portion 129, reading condition storing portion 121 and reading instructing portion 127A. Further, when the destination address is input, setting portion 125A outputs the destination address to electronic mail generating portion 131A.

When information indicating that the electronic mail is a return mail is received from electronic mail analyzing portion 123A, setting portion 125A outputs the reading condition to electronic mail generating portion 131A, associating portion 129, reading condition storing portion 121 and image converting portion 139. Here, the reading condition is not output to reading instructing portion 127.

Reading condition storing portion 121 receives as an input the reading condition from setting portion 125A. The reading condition input from setting portion 125A is the reading condition input by the user through input unit 108 or the reading condition extracted from the electronic mail. Reading condition storing portion 121 is connected to storing unit 105, and has the input reading condition stored in storing unit 105. When the destination address is input in addition to the reading condition from setting portion 125A, reading condition storing portion 121 has storing unit 105 store the input reading condition in association with the destination address.

User authentication portion 137 is connected to input unit 108 and storing unit 105. User authentication portion 137 compares the user identification information and the password input by the user through input unit 108 with the user identification information and the password stored in advance in storing unit 105. When they match as a result of comparison, the user is determined to be an authorized user, and if not the user is determined to be an unauthorized user. The result of user authentication is output to associating portion 129.

To associating portion 129, the reading condition is input from setting portion 125A, and the result of authentication is input from user authentication portion 137. Associating portion 129 associates the input reading condition with the one-touch key of input unit 108. The one-touch key has a predetermined button address, and associating portion 129 stores the button address in association with the reading condition that has been stored in storing unit 105. Association between the button address and the reading condition includes association of the address stored in storing unit 105 of the reading condition with the button address of the one-touch key. Associating portion 129 may associate the input reading condition to the one-touch key of input unit 108 on condition that the user is determined to be the authorized user as a result of authentication.

When pressing of the one-touch key at input unit 108 is detected, the button address of the one-touch key is input to one-touch information generating portion 133. Then, the reading condition stored in association with the button address is read from storing unit 105. One-touch information for displaying the read reading condition is generated. One-touch information generating portion 133 outputs the generated one-touch information to display control portion 135. Display control portion 135 controls display unit 107 and switches the information to be displayed on display unit 107. When the one-touch information is input from one-touch information generating portion 133, display control portion 135 controls display unit 107 such that the one-touch information is displayed on display unit 107.

Reading instructing portion 127A receives as an input the reading condition from setting portion 125A. The reading instructing portion, however, does not directly output the reading condition to scanner 103, but outputs a reading condition that is determined by the maximum performance of scanner 103 to scanner 103. Namely, maximum reading resolution and maximum document size are given as the reading condition. Such reading condition will be referred to as the reference reading condition. In response to an instruction from input unit 108, scanner 103 is activated. Thus, scanner 103 reads a document in accordance with the reference reading condition and outputs an image data. The instruction from the input unit 108 corresponds to pressing of start key 154. Scanner 103 stores the image data output by reading the document under the reference reading condition as a reference image data, in storing unit 105.

To image converting portion 139, the reading condition is input from setting portion 125A. When the reading condition is input, image converting portion 139 reads the reference image data from storing unit 105, and performs image-conversion of the reference image data in accordance with the input reading condition. The image converting process includes, by way of example, the process of covering the resolution to a lower resolution, the process of converting the document size to a smaller size, and the process of converting the reading density to coarse density (for example, the process of making wider the quantization width). The image data obtained as a result of image-conversion is output to electronic mail forming portion 131A. When the reading condition input from setting portion 125A is the same as the reference reading condition, image converting portion 139 does not perform the image-conversion, and directly outputs the reference image data to the electronic mail forming portion, as the image data.

When pressing of the one-touch key at input unit 108 is detected, the button address of the one-touch key is input to image converting portion 139. Then, the reading condition stored in association with the button address and the reference image data are read from storing unit 105. In response to the instruction from input unit 108, the read reference image data is image-converted in accordance with the read reading condition, and the converted image data is output to electronic mail generating portion 131A.

Electronic mail generating portion 131A is connected to image converting portion 139. To electronic mail generating portion 131A, the reading condition and the destination address are input from setting portion 125A. When the image data is input from image converting portion 139, electronic mail generating portion 131A generates an electronic mail having the destination address that has already been input from setting portion 125 described in the header portion, the reading condition converted to a prescribed format described as the main message at the body portion, and the image data as the attachment file, and outputs the generated electronic mail to communication unit 109.

Communication unit 109 transmits the electronic mail input from electronic mail generating portion 131A to mail server 2.

The main message of the electronic mail received or transmitted by MFP 1 in accordance with the second embodiment is described in the same format as that shown in FIG. 5. Therefore, electronic mail analyzing portion 123A extracts the destination address and the reading condition in accordance with the format, and electronic mail generating portion 131A generates the main message having the reading condition described in accordance with the format.

FIG. 6 shows an example of the one-touch information generated by one-touch information generating portion 133 of MFP 1 in accordance with the second embodiment.

In MFP 1 in accordance with the second embodiment, the electronic mail receiving process shown in FIG. 7 or the modification of the electronic mail receiving process shown in FIG. 8 takes place. Further, in MFP 1 in accordance with the second embodiment, the process executed when the user logs-in to the MFP shown in FIG. 9 takes place.

Figure 13:
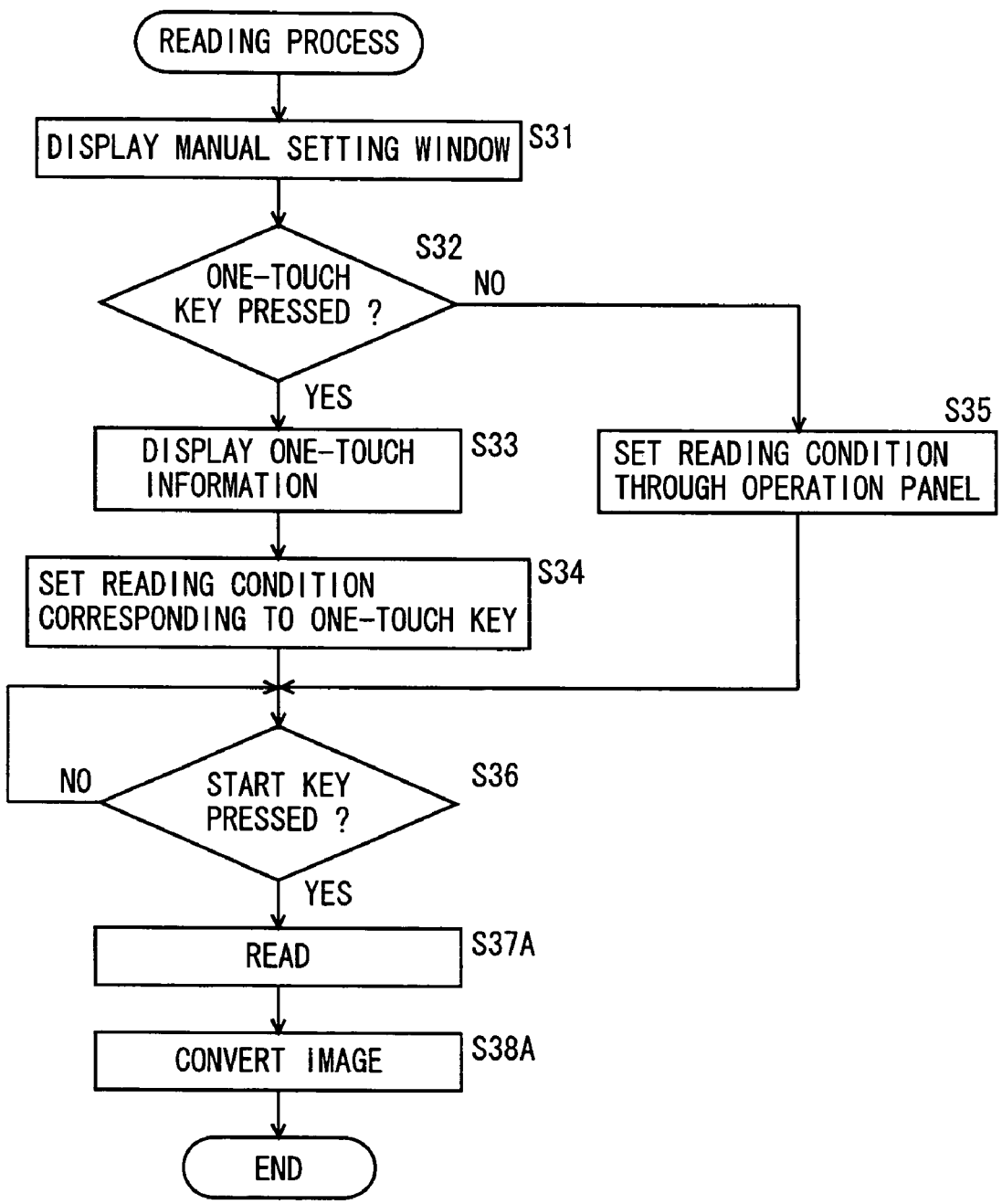
FIG. 13 is a flow chart representing a flow of a reading process executed by the MFP in accordance with the second embodiment.

FIG. 13 is a flow chart representing the flow of the reading process executed by the MFP in accordance with the second embodiment. In FIG. 13, the same process steps as the reading process executed by MFP 1 in accordance with the first embodiment shown in FIG. 10 are denoted by the same reference characters. Repetitive description will not be given here.

In step S36, when it is determined that start key 154 of operation panel 106 is pressed, the flow proceeds to step S37A, and otherwise, the flow is kept in a standby state. Specifically, until the start key 154 is pressed, setting of the reading condition by the user in step S35 is allowed. Further, it may be possible for the user to change the reading condition after checking the one-touch information.

In step S37A, a document is read in accordance with the reading condition determined by the maximum performance of scanner 103. Specifically, reading instructing portion 127 outputs the reading condition determined by the maximum performance of scanner 103 to scanner 103, and activates scanner 103. Thus, scanner 103 reads the document under the reading condition determined by the maximum performance, and stores the reference image data in storing unit 105. The reading condition determined by the maximum performance may be stored in advance in storing unit 105 or the like.

In the next step S38A, the reference image data stored in storing unit 105 is image-converted in accordance with the reading condition set in step S35.

In the reading process, the image data is obtained by reading the document, storing the reference image data and by image-converting the reference image data in accordance with the reading condition. The image data may be output to image forming unit 111 to be printed, stored in storing unit 105, or may be output to communication unit 109 to be transmitted to another apparatus. Here, a reading and transmitting process in which the image data is transmitted to another apparatus will be described.

Figure 14:
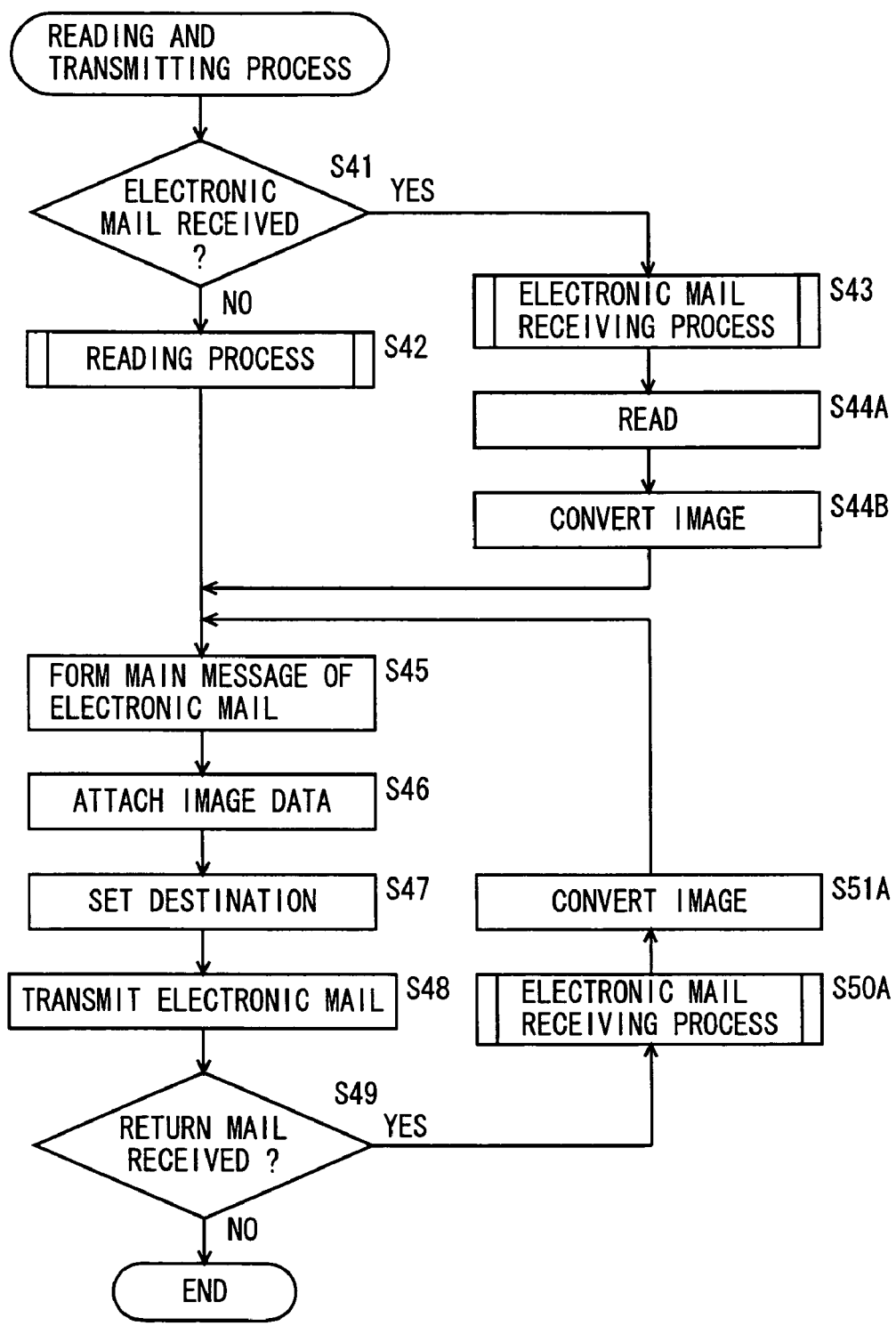
FIG. 14 is a flow chart representing a flow of a reading and transmitting apparatus executed by the MFP in accordance with the second embodiment.

FIG. 14 is a flow chart representing the flow of the reading and transmitting process executed by the MFP in accordance with the second embodiment. In FIG. 14, the same process steps as the reading and transmitting process executed by MFP 1 in accordance with the first embodiment shown in FIG. 11 are denoted by the same reference characters. Repetitive description will not be given here.

Referring to FIG. 14, in step S43, the electronic mail receiving process described with reference to FIG. 7 takes place. Under the reading condition determined by the maximum performance of scanner 103, a document is read (step S44A). Thus, the reference image data is stored in storing unit 105. In the next step S44B, the reference image data is subjected to image-conversion in accordance with the reading condition extracted from the electronic mail.

Then, the main message of the electronic mail is formed, (step S45), the image data obtained by reading the document is set as the attachment file of the electronic mail (step S46), the destination address is set as the destination at the header of the electronic mail (step S47), and the thus formed electronic mail is transmitted from communication unit 109 to mail server 2 (step S48). In step S49, whether a return mail to the electronic mail transmitted in step S48 has been received or not is determined. If a return mail has been received, the flow proceeds to step S50A, and otherwise, the process is terminated. Whether a mail is a return mail or not is determined from a message ID described at "in-Reply-to:" at the header of a received electronic mail.

In step S50A, the electronic mal receiving process described with reference to FIG. 7 is executed. When a return mail is received, the reference image data corresponding to the document as an object of processing has been stored in storing unit 105. Therefore, in the next step S51A, the reference image data is read from storing unit 105, and image-converted in accordance with the reading condition extracted from the received return mail. Then, the flow returns to step S45. In steps S45 to S48, an electronic mail corresponding to the return mail is newly formed, and the electronic mail is transmitted. The destination of the electronic mail may be the destination address described in the main message of the return mail, or it may be the electronic mail address of the source of the return mail.

It is possible for the user to have the reading condition and the image data on the display of user computer 4. Here, as MFP 1 has the reference image data stored in storing unit 105, it is unnecessary for the user to have the document read again by MFP 1. Further, it is possible to reevaluate the reading condition while viewing the read image data. When higher image quality is desired, or when smaller amount of data is desired by lowering image quality, the user may again form an electronic mail (return mail) describing the corresponding reading condition and return the mail to MFP 1, so that image data read under the corresponding reading condition can be received.

As described above, in MFP 1 in accordance with the present embodiment, when the reading condition and the destination are set, a document is read under the reading condition ensuring maximum performance of the reading unit, and the resulting reference image data is stored. The reference image data is image-converted under the set reading condition, and the result is transmitted by an electronic mail together with the reading condition. Therefore, it is possible for the user receiving the electronic mail to evaluate the reading condition while checking the image data. Thus, the condition for reading a document can be set easily.

Further, when a return mail to the transmitted electronic mail is received, the reading condition is extracted from the return mail, the reference image data is image-converted in accordance with the extracted reading condition and another image data is output. Therefore, it is unnecessary for the user to have the same document read again after changing the reading condition.

Further, another electronic mail that has the reading condition extracted from the return mail as the main message, said another image data as an attachment file and the destination determined from the return mail is transmitted. Therefore, it is possible to output the image data read under the reading condition different from the previous condition, without the necessity of again reading the same document. As a result, it becomes possible to easily set the reading condition to obtain image data of desired quality.

Though MFP 1 has been described in the first and second embodiments, the present invention may be implemented as a control program product executed by MFP 1, or a method of control executed by MFP 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
a reading unit reading a document and outputting an image data in accordance with a given reading condition;
an electronic mail transmitting and receiving unit transmitting and receiving an electronic mail;
a control unit controlling said reading unit and said electronic mail transmitting and receiving unit;
a user interface unit receiving an instruction input from a user; and
an authentication information storing unit storing in advance authentication information for user authentication;
wherein said control unit includes
a setting portion setting a destination address and a reading condition associated with the destination address,
a reading condition storing unit storing the reading condition in association with the destination address in a storing unit;
a reading instructing portion applying the reading condition set by said setting portion to said reading unit to have said reading unit output an image data,
an electronic mail generating portion generating and outputting to said electronic mail transmitting and receiving unit an electronic mail having the reading condition applied to said reading unit as a main message, the image data output from said reading unit as an attachment file and the destination address set by said setting portion as a destination;
an electronic mail analyzing portion analyzing, when a return mail corresponding to the electronic mail generated by said electronic mail generating portion is received, said received return mail and extracting a reading condition, and
an associating portion associating the reading condition extracted from said return mail with a one-touch key provided at said user interface unit;
wherein said control unit has said associating portion establish said association on condition that authentication information input through said user interface unit has been stored in said authentication information storing unit.

2. The image reading apparatus according to claim 1, wherein
said user interface unit includes a display portion displaying prescribed information; and
said control unit further includes a display control unit having the reading condition received by said electronic mail transmitting and receiving unit on said display portion in response to an input of an instruction of a one-touch key that is associated with the reading condition by said associating portion.

3. The image reading apparatus according to claim 1, wherein
said control unit includes a reading condition applying portion applying, when an instruction of a one-touch key that is associated with the reading condition by said associating portion is input, the reading condition associated with said instructed one-touch key to said reading unit.

4. The image reading apparatus according to claim 1, further comprising
a user interface unit receiving an instruction input from a user; wherein
said setting portion sets a reading condition and a destination address input through said user interface unit.

5. The image reading apparatus according to claim 1, wherein
an electronic mail analyzing portion analyzes, when an electronic mail for setting having a reading condition described is received by said electronic mail transmitting and receiving unit, the electronic mail for setting and extracts the reading condition and a destination address; and
said setting portion sets the reading condition and the destination address extracted by said electronic mail analyzing portion from said electronic mail for setting.

6. The image reading apparatus according to claim 1, wherein the reading condition relates to the quality of the image data output from the reading unit.

7. The image reading apparatus according to claim 1, wherein the reading condition comprises resolution, reading density and reading size.

8. A non-transitory computer readable medium encoded with a control program product for controlling an image reading apparatus including a reading unit reading a document and outputting an image data in accordance with a given reading condition, and an electronic mail transmitting and receiving unit transmitting and receiving an electronic mail, causing the image reading apparatus to execute the steps of:
receiving an instruction input from a user;
storing in advance authentication information for user authentication in an authentication information storing unit;
setting a destination address and a reading condition associated with the destination address;
storing the reading condition in association with the destination address in a storing unit;
applying the set reading condition to said reading unit to have said reading unit output an image data;
generating and outputting an electronic mail having the reading condition applied to said reading unit as a main message, the image data output by said reading unit as an attachment file and said set destination address as a destination;
analyzing, when a return mail corresponding to the generated electronic mail is received, said received return mail and extracting a reading condition; and
associating the reading condition extracted from said return mail with a one-touch key provided at said user interface unit of the image reading apparatus;
wherein the association of the reading condition extracted with the one-touch key is established on condition that authentication information input by the user has been stored in said authentication information storing unit.

9. A control method for controlling an image reading apparatus including a reading unit reading a document and outputting an image data in accordance with a given reading condition, and an electronic mail transmitting and receiving unit transmitting and receiving an electronic mail, said control method comprising the steps of:
receiving an instruction input from a user;
storing in advance authentication information for user authentication in authentication information storing unit;
setting a destination address and a reading condition associated with the destination address;
storing the reading condition in association with the destination address in a storing unit;
applying the set reading condition to said reading unit to have said reading unit output an image data;
generating and outputting to said electronic mail transmitting and receiving unit an electronic mail having the reading condition applied to said reading unit as a main message, the image data output by said reading unit as an attachment file and said set destination address as a destination;
analyzing, when a return mail corresponding to the generated electronic mail is received, said received return mail and extracting a reading condition, and
associating the reading condition extracted from said return mail with a one-touch key provided at said user interface unit of the image reading apparatus;
wherein said step of associating the reading condition extracted with the one-touch key is established on condition that authentication information input by the user has been stored in said authentication information storing unit.

10. The method according to claim 9, wherein the reading condition relates to the quality of the image data output from the reading unit.

11. The method according to claim 9, wherein the reading condition comprises resolution, reading density and reading size.

* * * * *